United States Patent [19]

Kovacs et al.

[11] 4,384,101

[45] May 17, 1983

[54] SOLVENT-FREE POLYURETHANE RESIN MIXTURE

[75] Inventors: Zoltan Kovacs, Zurich; Roland Schuler, Wettingen, both of Switzerland

[73] Assignee: BBC Brown, Boveri & Company, Limited, Baden, Switzerland

[21] Appl. No.: 309,893

[22] PCT Filed: Mar. 2, 1981

[86] PCT No.: PCT/CH81/00025

§ 371 Date: Oct. 7, 1981

§ 102(e) Date: Oct. 7, 1981

[87] PCT Pub. No.: WO81/02647

PCT Pub. Date: Sep. 17, 1981

[30] Foreign Application Priority Data

Mar. 3, 1980 [EP] European Pat. Off. ........ 80200188.3

[51] Int. Cl.$^3$ ...................... C08G 18/30; C08G 18/18; C08G 18/16
[52] U.S. Cl. ......................................... 528/73; 528/52
[58] Field of Search ................................... 528/73, 52

[56] References Cited

U.S. PATENT DOCUMENTS

| | | | |
|---|---|---|---|
| 3,198,851 | 8/1965 | Hoy | 528/52 |
| 4,022,721 | 5/1977 | Ashida | 528/73 |
| 4,070,416 | 1/1978 | Narahara et al. | 528/73 |
| 4,130,546 | 12/1978 | Goto et al. | 528/73 |
| 4,143,009 | 3/1979 | Dewey | 528/73 |
| 4,224,422 | 9/1980 | Rude et al. | 525/454 |

*Primary Examiner*—H. S. Cockeram
*Attorney, Agent, or Firm*—Oblon, Fisher, Spivak, McClelland & Maier

[57] ABSTRACT

A solvent-free resin mixture which is curable by thermosetting, in particular for use as a highly heat-resistant impregnating, varnishing and casting resin for the insulation of electrical conductors and windings in electrical machinery and equipment, contains at least one reactive liquid epoxide compound, at least one reactive liquid polyisocyanate and at least one latent hardener for these components; the mixture also contains triallyl cyanurate as a crosslinking agent.

10 Claims, No Drawings

SOLVENT-FREE POLYURETHANE RESIN MIXTURE

The invention relates to a resin mixture which is curable by thermosetting and is virtually free of volatile solvents, and which is suitable in particular as a highly heat-resistant impregnating, varnishing and casting resin for the insulation of electrical conductors and windings in electrical machinery and equipment, for example as an impregnating resin for electrical machinery of temperature rating H-C.

The mixtures known for this purpose, for example from German Auslegeschrift No. 2,444,458, consisting of epoxide compounds, polyisocyanates and a hardener based on morpholine compounds or imidazole compounds, have a pot life (measured time up to a doubling of the viscosity at 23° C.) of only a few hours, which is generally far too short for economical production. To overcome the disadvantage of the excessively short pot life of such mixtures, it is known, for example from German Patent Specification No. 2,655,367, to use certain addition complexes of tertiary amines and boron trichloride as latent hardeners, instead of the morpholine compounds or imidazole compounds. This leads to a considerable increase in the pot life of the mixture, for example to more than 100 days, but at the same time leads to a deterioration in the mechanical properties of the mixture cured by thermosetting, to the extent that such mixtures are no longer directly suitable as insulating resins for high-utilization machinery, that is to say machinery which will withstand considerable heat in operation.

The object of the invention is to provide a resin mixture which is curable by thermosetting and is solvent-free (that is to say virtually free of volatile solvents), and which contains reactive liquid epoxide compounds and polyisocyanates as components, and also a latent hardener for these components, and has a pot life of the order of magnitude of a few weeks, without impairment of the mechanical properties.

This object is achieved according to the invention by using triallyl cyanurate as the crosslinking agent in such mixtures. Triallyl cyanurate (also abbreviated to TAC below) is a known and industrially obtainable compound of the formula

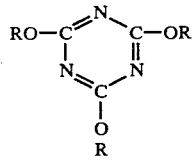

in which R denotes the allyl radical, $-CH_2CH=CH_2$. TAC is liquid above 28° C. (melting point=27.3° C.) and boils at 120° C.; the ability of TAC to undergo addition reactions or copolymerization reactions, and its tendency to undergo extensive crosslinking, are in themselves to be expected from its structure containing three terminal olefin groups, and its use for improving the heat resistance of polyester resins is known.

However, it is surprising that, when added to the mixtures described above, TAC does not critically reduce their pot life, that is to say makes it possible to eliminate the disadvantages (short pot life) of the resin mixtures of German Auslegeschrift No. 2,444,458, without the disadvantages, hitherto associated therewith, of the resin mixtures according to German Auslegeschrift No. 2,655,367 (considerable deterioration in the mechanical properties of the cured mixture, that is to say of the thermosetting resin formed).

The components of resin mixtures according to the invention are illustrated below. Information on the thermosetting resin relates to the cured mixture.

In general, mostly relatively low-viscosity aliphatic, cycloaliphatic and aromatic, monomeric or oligomeric compounds, carbodiimides formed from the monomers, or mixtures thereof, are suitable here as polyisocyanates, in particular diisocyanates or triisocyanates. Aromatic polyisocyanates impart a relatively high heat resistance and good electrical properties (for example a high dielectric strength) to the thermosetting resin. Aliphatic polyisocyanates are preferably used for the most part only in comparatively small proportions, in order to plasticize the thermosetting resin. An isomer mixture of diphenylmethane 4,4'-diisocyanate and 2,4'-diisocyanate with a very low chlorine content, and/or isophorone diisocyanate, is preferred for many applications. The isomer mixture of diphenylmethane 4,4'-diisocyanate and 2,4'-diisocyanate can in some cases also be replaced by carbodiimides formed from these polymers.

Further specific examples of polyisocyanate resins are given in the abovementioned publications and include the following substances in particular: alkane diisocyanates, such as butane 1,1- or 1,2- or 1,4-diisocyanate, propane 1,3-diisocyanate, 2-methylbutane 1,4-diisocyanate, pentane 1,5-diisocyanate, 2,2-dimethylpentane 1,5-diisocyanate, hexane 1,6-diisocyanate, heptane 1,7-diisocyanate, octane 1,8-diisocyanate, nonane 1,9-diisocyanate and decane 1,10-diisocyanate, aryl or alkaryl, aralkyl or cycloalkyl diisocyanates, such as dimethylbenzene diisocyanates, dimethylcyclohexane diisocyanates, dimethylnaphthalene diisocyanates, cyclohexane 1,3-diisocyanate or 1,4-diisocyanate, dicyclohexylmethane 4,4'-diisocyanate, phenylene diisocyanates, methylbenzene diisocyanates, diphenyl ether diisocyanates, biphenyl diisocyanates, dimethylbiphenyl diisocyanates, dimethoxybiphenyl diisocyanates, diphenylmethane diisocyanates and carbodiimides formed from the latter, dimethoxydiphenylmethane diisocyanates, and trifunctional or polyfunctional isocyanates, such as polymethylenepolyphenyl isocyanate, triphenylmethane triisocyanate and diphenylmethane 3,3',4,4'-tetraisocyanate.

Mixtures of two or more of the said polyisocyanates are also suitable.

Aliphatic, cycloaliphatic or aromatic epoxide compounds of relatively low viscosity, and mixtures thereof, can be used as polyepoxide compounds. Bisphenol A diglycidyl ether and/or bisphenol F diglycidyl ether are preferred for many applications.

Further specific examples of epoxide compounds can be found in "Handbook of Epoxy Resins" by H. Lee et al., 1967, in "Epoxy Resins" (Amer. Chem. Soc. 1970) and in the abovementioned patent specifications. These epoxide compounds include, for example, butadiene diepoxide, 3,4-epoxycyclohexylmethyl-(3,4-epoxy)-cyclohexanecarboxylate, vinylcyclohexane dioxide, 4,4'-di-(1,2-epoxyethyl)-diphenyl ether, 4,4'-di-(1,2-epoxyethyl)-biphenyl, 2,2-bis-(3,4-epoxycyclohexyl)-propane, the diglycidyl ether of resorcinol, of phloroglucinol and of methylphloroglucinol, bis-(2,3-epoxycyclopentyl) ether, 2-(3,4-epoxy)-cyclohexane-5,5-spiro- (3,4-epoxy)-cyclohexane-m-dioxane, bis-(3,4-epoxy-6-methylcyclohexyl) adipate and N,N'-m-phenylene-bis-(4,5-epoxy-1,2-cyclohexanedicarboximide), and trifunctional or polyfunctional epoxy compounds, such as the triglycidyl ether of para-aminophenol, polyallyl glycidyl ether, 1,3,5-tri-(1,2-epoxyethyl)-benzene, 2,2',4,4'-tetraglycidoxybenzophenone, tetraglycidoxytetraphenylethane, the polyglycidyl ether of a phenol/formaldehyde novolac, the triglycidyl ether of glycerol and the triglycidyl ether of trimethylolpropane.

Examples of suitable latent hardeners (catalysts) are the addition complexes, described in German Patent Specification 2,655,367, of boron trichloride and a tertiary amine, of the formula $BCl_3.NR^1R^2R^3$, in which $R^1$, $R^2$ and $R^3$ are identical or different organic radicals which, in pairs, can also represent parts of heterocyclic rings. The analogous boron trifluoride complexes of the formula $BF_3.NR^1R^2R^3$, in which $R^1$, $R^2$ and $R^3$ are defined as above, are also suitable. Specific examples of suitable tertiary amines for the $BF_3$ or $BCl_3$ complexes are octyldimethylamine and benzyldimethylamine. Di-(lower acyl)-amines, di-(lower alkyl)-aryl-amines, di-(lower alkyl)-aracyl-amines and di-(lower alkyl)-heterocycloamines may be mentioned as a group of tertiary amines.

Other hardeners, such as the monomorpholine or dimorpholine compounds and imidazoles mentioned in German Auslegeschrift No. 2,444,458, are also suitable. Other latent hardeners, such as, for example, a mixture of triethanolamine-titanate chelates with boric acid ester, such as described by D. E. Kline in J. Polymer Sci. 47, 237 (1960), and by H. Zumstein in Plastics Technology 9/1, 11 (1963), are also suitable. If desired, it is possible to accelerate the isocyanate ring formation, during the curing of the mixture, by adding potassium acetate.

As mentioned, triallyl cyanurate is the compound used for crosslinking, according to the invention, as the additional fourth component of the new mixtures curable by thermosetting.

The mixture can contain further components, but these preferably do not participate in the polymerization reaction leading to the thermosetting resin. Fillers or dyestuffs and also stabilizers of the conventional type are also suitable as optional additives. Fillers can be used. Normally, for the preferred mode of application, that is to say as an impregnating resin, no filler additives are used because the mixture should not contain any components which increase the viscosity unnecessarily, and because the mechanical structure desired in most cases is provided by the impregnated material together with the porous material of the intermediate layer, after the curing of the mixture.

Preferably, the proportions of the mixture according to the invention are chosen so that it contains 2 to 5.5 equivalents, and preferably 2 to 3.5 equivalents, of polyisocyanate per equivalent of polyepoxide compound.

The latent hardener can be used in customary proportions of, for example, 0.01 to 5% by weight, preferably 0.05 to 2.5% by weight, in each case relative to the weight of the total mixture. The curing temperature and curing period can be influenced, in a manner which is in itself known, by the type and concentration of the latent hardener.

The triallyl cyanurate is used in most cases in proportions of more than 0.1% by weight and less than 30% by weight, relative to the weight of the total mixture. TAC proportions of less than 0.1% by weight do not bring any significant improvements in properties, whilst proportions of more than 30% by weight can frequently lead to undesired embrittlement. TAC proportions in the range from 0.5 to 10% by weight, in particular 0.5 to 3% by weight, are suitable for many purposes.

In the following examples, in which percentages are by weight, the following components are used:

(A-1) Polyisocyanate: Mixture (about 1:1) of diphenylmethane 4,4'-diisocyanate and 2,4'-diisocyanate,

| | |
|---|---|
| dynamic viscosity at 25° C. | 15 mPas |
| NCO content | 33% |
| NCO equivalent weight | 130 g/mole |
| molecular weight | 250 |
| total chlorine | <100 ppm |

(A-2) Polyisocyanate: Mixture (about 1:10) of diphenylmethane 4,4'-diisocyanate and 2,4'-diisocyanate, 20% of this mixture being in the form of carbodiimide,

| | |
|---|---|
| dynamic viscosity at 25° C. | 15 mPas |
| NCO content | 29% |
| NCO equivalent weight | 143 g/mole |

(A-3) Polyisocyanate: isophorone diisocyanate

| | |
|---|---|
| dynamic viscosity at 23° C. | 15 mPas |
| NCO content | 37.5% |
| NCO equivalent weight | 111.1 |
| molecular weight | 222.3 |
| total chlorine | <150 ppm |

(B-1) Epoxide compound: bisphenol A diglycidyl ether (purified by molecular distillation),

| | |
|---|---|
| dynamic viscosity at 23° C. | 3,000 mPas |
| at 40° C. | 680 mPas |
| epoxide equivalent weight | 172–176 g/mole |
| OH content | not detectable |
| melting point | 42° C. |

(B-2) Epoxide compound: bisphenol F diglycidyl ether,

| | |
|---|---|
| dynamic viscosity at 23° C. | 5,000–7,000 mPas |
| epoxide equivalent weight | 170–183 g/mole |

EXAMPLE 1

1 equivalent of epoxide compound B-1 (purified by molecular distillation, epoxide equivalent: 175) and 2 equivalents of polyisocyanate A-1 were mixed with 0.2% of boron trichloride/octyldimethylamine addition complex and with 1% of triallyl isocyanurate. The initial viscosity of the mixture according to the invention, obtained in this way, was 70 mPas at 23° C. The pot life on the evidence of a doubling of the viscosity was more than 50 days at a storage temperature of 23° C.

The mixture could be completely cured in 15 hours at 160° C. and then had a flexural strength value (23° C.) of 180 N/mm$^2$.

EXAMPLE 2

(Comparison)

The procedure of Example 1 was followed, but no TAC was added.

Although the resulting mixture not according to the invention had a pot life of about 50 days, it had a considerably lower flexural strength (118 N/mm$^2$) after curing under the conditions of Example 1.

EXAMPLE 3

The procedure of Example 1 is repeated using an equivalent amount of polyisocyanate A-2 instead of A-1; similarly good results are obtained as in Example 1, in respect of pot life and flexural strength.

EXAMPLE 4

The procedure of Example 1 is repeated using an equivalent amount of polyisocyanate A-3 instead of A-1; similarly good results are obtained as in Example 1, in respect of pot life and flexural strength.

EXAMPLE 5

The procedure of Example 1 is repeated using an equivalent amount of epoxide compound B-2 instead of B-1; similarly good results are obtained as in Example 1, in respect of pot life and flexural strength.

In general, curing temperatures between 100° and 250° C., in particular 150°–210° C., and curing periods of a few hours can be used.

Resin mixtures according to the invention can advantageously be used for varnishing or impregnating substances capable of being impregnated (fabrics, tapes, nonwovens and their combinations with materials such as mica), such as those used in the technology of electrical insulation of electrical machinery and equipment of the conventional type, in order substantially to improve the properties of the insulations of the electrical conductors and windings and of their mechanical, electrically non-conducting support elements, in particular their electrical, mechanical and thermal properties.

We claim:

1. A solvent-free, curable thermosetting resin mixture useful for the insulation of electrical conductors and windings, which comprises:
   (a) at least one reactive liquid polyepoxide compound,
   (b) at least one reactive liquid polyisocyanate,
   (c) from 0.01 percent to 5 percent by wt based on the total weight of the mixture of at least one latent hardener for said components (a) and (b),
   (d) an effective cross-linking amount of triallyl cyanurate, said mixture containing from 2 to 5.5 equivalents of said polyisocyanate per equivalent of polyepoxide compound.

2. The mixture of claim 1, wherein the amount of said triallyl cyanurate in the total mixture ranges from 0.1% to 30% by weight.

3. The mixture of claim 1 or 2, wherein said polyisocyanate is a low viscosity aliphatic, cycloaliphatic or aromatic, monomeric or oligomeric compound, a carbodiimide of said monomeric compound, or mixtures thereof.

4. The mixture of claim 3, wherein said polyisocyanate is a mixture of diphenylmethane 4,4'-diisocyanate and 2,4'-diisocyanate, isophorone diisocyanate and mixtures thereof.

5. The mixture of claim 3, wherein said polyisocyanate is butane 1,1- or 1,2- or 1,4-diisocyanate, propane 1,3-diisocyanate, 2-methylbutane 1,4-diisocyanate, pentane 1,5-diisocyanate, 2,2-dimethylpentane 1,5-diisocyanate, hexane 1,6-diisocyanate, heptane 1,7-diisocyanate, octane 1,8-diisocyanate, nonane 1,9-diisocyanate or decane, 1,10-diisocyanate.

6. The mixture of claim 1, wherein said polyepoxy compound is bisphenol A diglycidyl ether.

7. The mixture of claim 1, wherein said latent hardener is an amine complex of BCl$_3$ or BF$_3$.

8. The mixture of claim 7, wherein said amine is a tertiary amine.

9. The mixture of claim 1, wherein said polyepoxide comound is butadiene diepoxide, 3,4-epoxycyclohexylmethyl-(3,4-epoxy)-cyclohexanecarboxylate, vinylcyclohexene dioxide, 4,4'-di-(1,2-epoxyethyl)diphenylether, 4,4'-di-(1,2-epoxyethyl)-biphenyl, 2,2-bis-(3,4-epoxycyclohexyl)propane, the diglycidyl ether of resorcinol, of phloroglucinol or a methylphloroglucinol, bis(2,3-epoxycyclopentyl)ether, 2-(3,4-epoxy)cyclohexane-5,5-spiro-(3,4-epoxy)-cyclohexane-m-dioxane, bis(3,4-epoxy-6-methylcyclohexyl) adipate, N,N'-m-phenylene bis-(4,5-epoxy-1,2-cyclohexandicarboximide), the triglycidylether of p-aminophenol, polyallyl glycidyl ether, 1,3,5-tri-(1,2-epoxyethyl)-benzene, 2,2',4,4'-tetraglycidoxy benzophenone, tetraglycidoxytetraphenylethane, the polyglycidyl ether of a phenol/formaldehyde novolac, the triglycidyl ether of glycerol or the triglycidyl ether of trimethylolpropane.

10. A method for the insulation of electrical machinery, which comprises:
   applying the resin mixture of claim 1 to an electrical component.

* * * * *